(12) United States Patent
Morita et al.

(10) Patent No.: US 8,125,689 B2
(45) Date of Patent: Feb. 28, 2012

(54) IMAGE PROCESSING APPARATUS AND METHOD FOR ASSOCIATING A PLURALITY OF PIECES OF CONTENT DATA

(75) Inventors: Hiroyasu Morita, Yokohama (JP); Satoshi Ookuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1017 days.

(21) Appl. No.: 12/049,990

(22) Filed: Mar. 17, 2008

(65) Prior Publication Data

US 2008/0316537 A1 Dec. 25, 2008

(30) Foreign Application Priority Data

Jun. 22, 2007 (JP) ................................. 2007-165648

(51) Int. Cl.
*H04N 1/40* (2006.01)
(52) U.S. Cl. ....... 358/3.28; 358/1.18; 358/403; 382/306
(58) Field of Classification Search .................... 358/1.1, 358/1.18, 400, 403, 3.28; 382/305, 306; 707/E17.013; 715/205, 207, 234
See application file for complete search history.

(56) References Cited

U.S. PATENT DOCUMENTS

| 5,692,073 | A | * | 11/1997 | Cass | 382/219 |
| 6,332,039 | B1 | * | 12/2001 | Bando et al. | 382/195 |
| 6,996,276 | B2 | * | 2/2006 | Liu et al. | 382/218 |
| 2007/0035745 | A1 | * | 2/2007 | Izumi et al. | 358/1.1 |

FOREIGN PATENT DOCUMENTS

| CN | 1236457 A | 11/1999 |
| JP | 10-97608 A | 4/1998 |

* cited by examiner

*Primary Examiner* — Thomas D Lee (74) *Attorney, Agent, or Firm* — Canon U.S.A. Inc., I.P. Division

(57) ABSTRACT

An image processing apparatus includes at least one input device for inputting a plurality of pieces of content data; a recognition unit configured to recognize a mark included in the pieces of content data, and an association processing unit configured to perform association processing by mutually establishing a link between at least two pieces of content data based on the mark recognized by the recognition unit.

11 Claims, 9 Drawing Sheets

FIG.9

IMAGE PROCESSING APPARATUS AND METHOD FOR ASSOCIATING A PLURALITY OF PIECES OF CONTENT DATA

BACKGROUND OF THE INVENTION

1. Field of the Invention

The present invention relates to an image processing apparatus and a method adapted to perform association processing between image data.

2. Description of the Related Art

As digitization and networking proceed, the practice of converting a variety of information to electronic content for storing and distribution has become widespread. For instance, document data generated by a personal computer (PC), image data generated by digitizing a paper document with a scanner apparatus, and image data photographed by a digital camera are stored in a server or distributed via E-mail on a daily basis.

In this circumstance, there are cases where image data is stored and saved in addition to text files input by using a PC or the like as materials prepared as minutes after the conference is held. Examples of such practice may include generating image data by scanning handouts with a hand-written memo, or generating image data by digitally photographing hand-written content on a whiteboard at the conference (see Japanese Patent Application Laid-Open No. 10-97608).

When referring back to the minutes of the conference afterwards, there is a need for consulting the content written on the whiteboard to know the relationship of a plurality of materials.

However, since such a plurality of image data is usually stored separately, any information regarding the association between the written content of the whiteboard and content of the handouts cannot be recorded.

For that reason, the user has to determine these associations based on the user's memory. Alternatively, the user needs to separately prepare a management table in which associations are described, or the user needs to manually embed association information into a file. However, there are problems that the former has possibility that association information becomes uncertain, while the latter takes a lot of time and trouble.

With respect to such association of images, there is proposed a document association technique using mark recognition. Japanese Patent Application Laid-Open No. 10-97608 discusses an apparatus configured to read sentences of a plurality of pages in which the same symbol is marked on two associated pages and to generate a document using a structure description language enabling accessing mutual pages while recognizing that symbol. With this apparatus, the user can generate a document in which association is assigned between two pages, by attaching the same symbol to two associated pages and causing the apparatus to read these pages.

However, the technique discussed in Japanese Patent Application Laid-Open No. 10-97608 is directed to generating a single document having association information for pages, and is not directed to allowing a cross-reference among a plurality of documents. In addition, the association information is added only between two pages. Therefore, a plurality of files cannot be associated with one another regarding a certain item.

SUMMARY OF THE INVENTION

The present invention is directed to facilitating easy and reliable association between mutually independent image data.

According to an aspect of the present invention, an image processing apparatus includes at least one input device for inputting a plurality of pieces of content data, a recognition unit configured to recognize a mark included in the pieces of content data, and an association processing unit configured to perform association processing by mutually establishing a link between at least two pieces of the content data based on the mark recognized by the recognition unit.

According to an exemplary embodiment of the present invention, if a mark is written, for example, on a paper document and a whiteboard, association is automatically performed between image data acquired by reading the paper document with a scanner and image data acquired by photographing the whiteboard with a digital camera. Accordingly, association between mutually independent image data can be easily and reliable performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
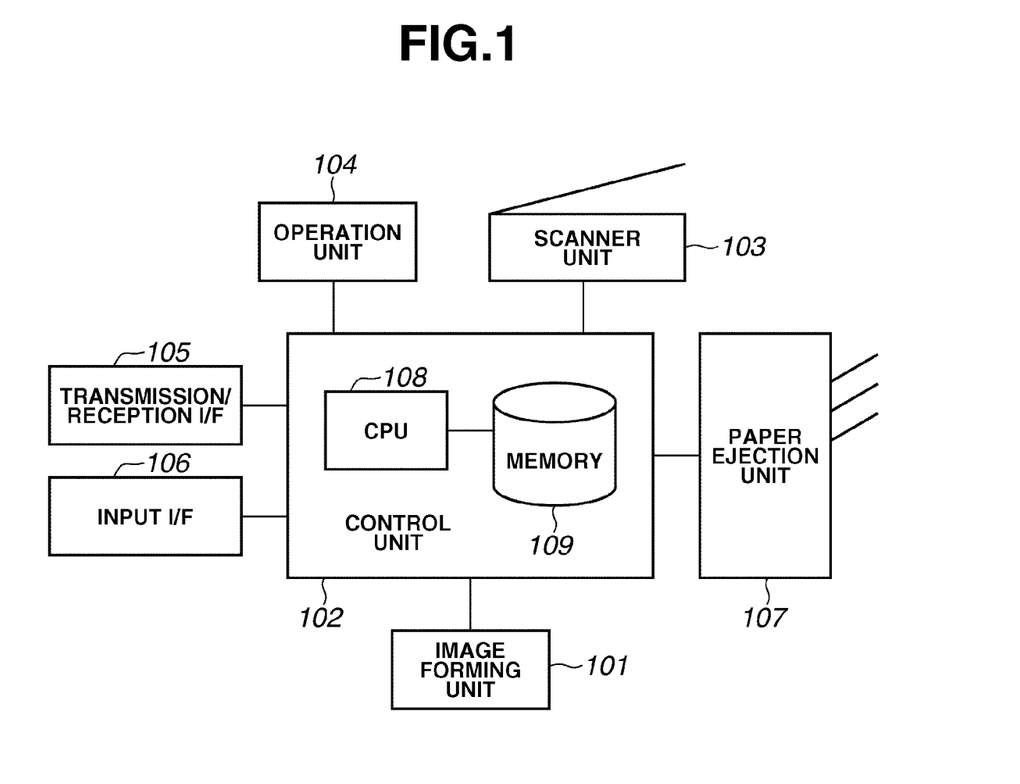
FIG. 1 is a view illustrating an example of a configuration of a multifunction peripheral according to an exemplary embodiment of the present invention.

FIG. 1 is a view illustrating an example of a configuration of a multifunction peripheral according to an exemplary embodiment of the present invention. The multifunction peripheral functions as an image processing apparatus. The multifunction peripheral includes an image forming unit 101, a control unit 102, and a scanner unit 103. The control unit 102 controls the multifunction peripheral. The scanner unit 103 functions as an image reading unit. The multifunction peripheral further includes an operation unit 104, a transmission/reception interface 105, an input interface 106, and a paper ejection unit 107. The image forming unit 101, the scanner unit 103, the operation unit 104, the transmission/reception interface 105, the input interface 106, and the paper ejection unit 107 are connected to the control unit 102 via a dedicated interface. The control unit 102 includes a central processing unit (CPU) 108 and a storage device (memory) 109.

The operation unit 104 is operable to select a transmission destination for storing image data and a transmission mode. In addition, a document can be set on the scanner unit 103. The operation unit 104 is further operable to specify an image input from an external apparatus via the input interface 106 or an image stored in the storage device 109 as an operation object image.

In reading processing on a document with the scanner unit 103, reading setting of a reading document size, a reading resolution, and a color mode can be performed. In storage processing on image data read with the scanner unit 103, a file format for storage, name of the document, and a storage destination can be selected and specified. At this time, image conversion can be performed appropriately depending on specified storage destination or file format if necessary. As the storage destination, the storage device 109 of the multifunction peripheral or a file server on a network can be specified.

Further, a plurality of images can be selected via the operation unit 104 to instruct association processing. When the association processing is instructed, the multifunction peripheral determines association of the plurality of images, generates link information, and, when converting the selected image into a specified file format, embeds the link information into the plurality of images before storing the plurality of images.

Figure 2:
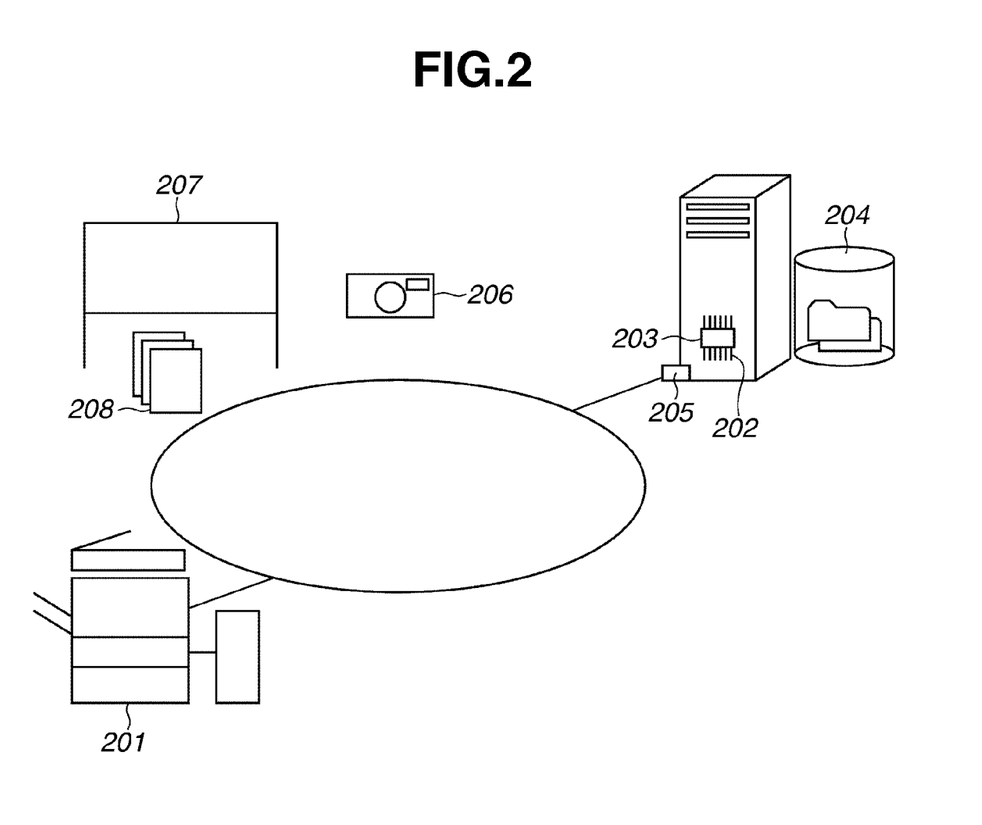
FIG. 2 is a view illustrating an example of a configuration of a network system according to an exemplary embodiment of the present invention.

FIG. 2 is a view illustrating an example of a configuration of a network system according to an exemplary embodiment of the present invention. In FIG. 2, the network system includes a multifunction peripheral 201 according to the present embodiment and a file server 202 storing document data, each of which is connected to a network. The file server 202 includes a central processing unit 203, a storage device 204, and a communication interface 205 as principal units. In addition, in FIG. 2, the network system includes a digital camera 206 serving as an image pickup apparatus, a whiteboard 207 used in a conference, and 208 a paper document (handout) distributed in the conference.

Figure 5:
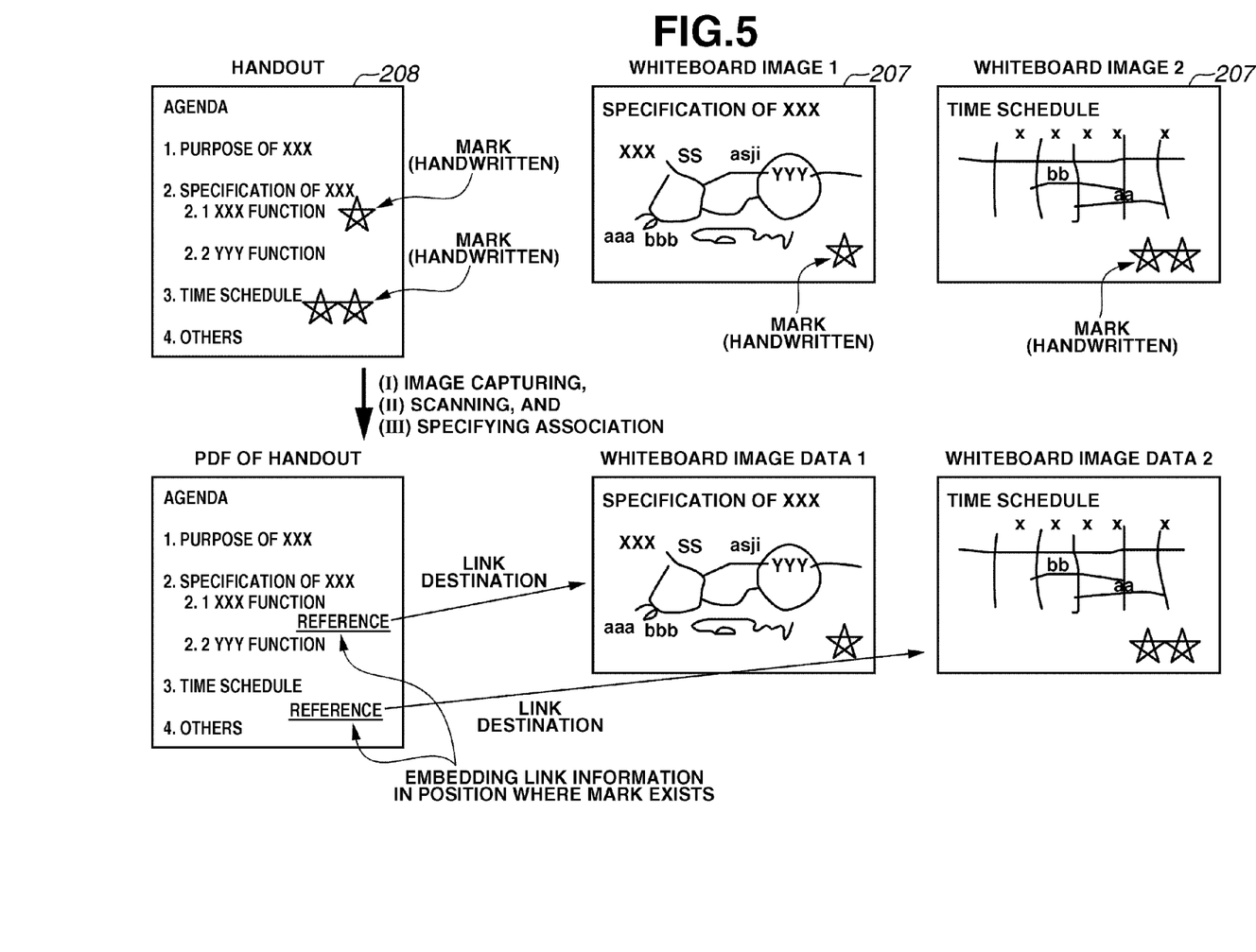
FIG. 5 is a view illustrating a relationship between a handout and a whiteboard and a result of association processing according to the first exemplary embodiment of the present invention.

Association processing of image data is described now with reference to FIG. 5. FIG. 5 is a view illustrating a relationship between the handout 208 and the whiteboard 207 and a result of the association processing according to the present embodiment. In the whiteboard 207, which is associated with the handout 208, a mark similar to a specific mark (in the illustrated example, one star mark or two star marks) written in the handout 208 is written by the user. In the example illustrated in FIG. 5, one star mark is written to an image on the whiteboard 207, and two star marks are written to another image on the whiteboard 207.

Then, the user reads the handout 208 with the scanner unit 103 and photographs the whiteboard 207 with the digital camera 206. Some whiteboards today include a scanner that allows the user to scan the information on the whiteboard 207. It will be appreciated that the information from the whiteboard 207 may be captured with such a scanner instead of the digital camera 206. Then, the user causes the multifunction peripheral 201 to capture image data of the handout 208 and photographed image data of the whiteboard 207 and to perform association processing based on the mark. According to this processing, link information (reference information) to the photographed image data of the whiteboard 207, which is associated with the handout 208, is embedded into the image data of the handout 208.

Figure 3:
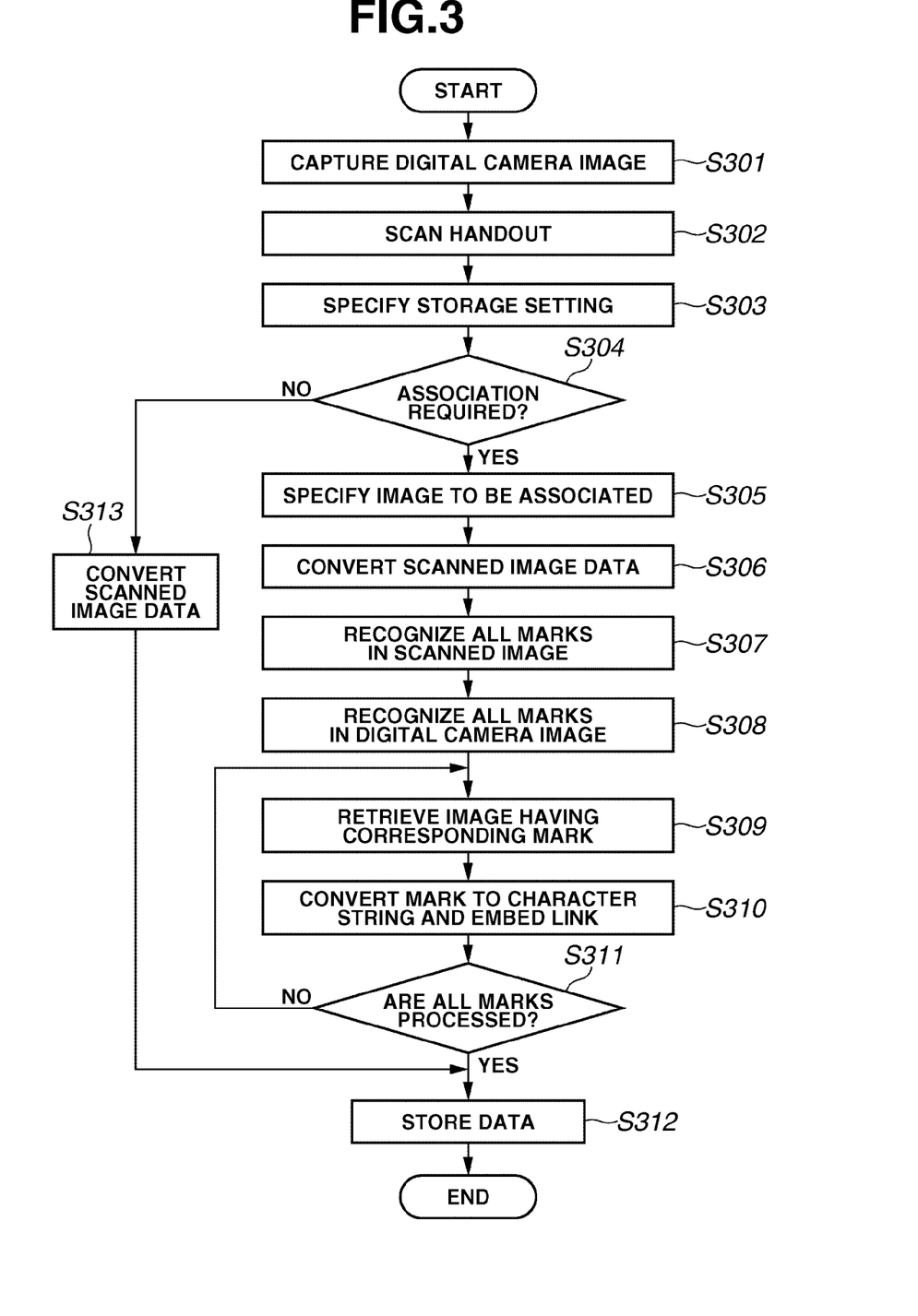
FIG. 3 is a flowchart illustrating a processing operation performed by the multifunction peripheral according to a first exemplary embodiment of the present invention.

The association processing of image data is described in detail below with reference to FIG. 3. FIG. 3 is a flowchart illustrating a processing operation performed by the multifunction peripheral 201. For example, the multifunction peripheral 201 performs association processing between image data acquired by reading, with the scanner unit 103, the paper document (handout) 208 distributed in the conference and image data acquired by photographing, with the digital camera 206, the whiteboard 207 used in the conference and stores the image data after the association processing. The multifunction peripheral 201 reads the handout 208 and photographs the whiteboard 207 after the user writes marks to respective associated portions on the handout 208 and the whiteboard 207.

In step S301, the user operates the operation unit 104 to instruct the multifunction peripheral 201 to capture image data. The multifunction peripheral 201 captures image data acquired by photographing, with the digital camera 206, the whiteboard 207 used in the conference into the storage device 109 via the input interface 106. The multifunction peripheral 201 can be physically directly connected to the digital camera 206 via a universal serial bus (USB), or the multifunction peripheral 201 can be connected to the digital camera 206 by using radio technique or a device port.

In step S302, the user reads the handout 208 with the scanner unit 103 after performing appropriate reading setting via the operation unit 104. The multifunction peripheral 201 captures the scanned image data into the storage device 109. In reading the handout 208, the reading setting of a reading document size, a reading resolution, and a color mode can be performed.

In step S303, the user performs storage setting of a file format, a document name, and a storage destination for storing the captured image data. The selectable file format includes Tag Image File Format (TIFF), Joint Photographic Experts Group (JPEG), Portable Document Format (PDF), and HyperText Markup Language (HTML). In cases where PDF and HTML are specified as the file format, the user can specify the association processing. In addition, as a storage destination of image data, the user can specify the storage device 109 of the multifunction peripheral 201 or a directory of the file server 202 on the network.

In step S304, the central processing unit 108 determines whether the association processing is specified during the storage setting in step S303.

If the determination in step S304 is NO, then in step S313, the central processing unit 108 converts the image data of the handout 208 read in step S302 into the file format specified in step S303. Then, in step S312, the central processing unit 108 stores the converted image data in the specified storage destination, and then the processing ends.

If the determination in step S304 is YES, then in step S305, the user operates the operation unit 104 to specify image data to be associated among the photographed image data of the whiteboard 207 captured in step S301.

In step S306, the central processing unit 108 converts the image data of the handout 208 read in step S302 into the file format specified in step S303.

In step S307, the central processing unit 108 recognizes all marks included in the image data of the handout 208 read in step S302. Similarly, in step S308, the central processing unit 108 recognizes all marks included in the photographed image data of the whiteboard 207 to be associated specified in step S305.

In step S309, the central processing unit 108 retrieves photographed image data having a mark similar to the mark recognized in step S307 among the photographed image data of the whiteboard 107 specified in step S305. In this case, the central processing unit 108 determines whether the mark is a similar mark with a margin of a degree of similarity, not completely the same mark, because the mark is hand-written.

In step S310, the central processing unit 108 converts the mark into a character string (in the illustrated example, "REFERENCE") indicating that a link is established, in the image data of the handout 208 converted into the specified file format in step S306. Then, the central processing unit 108 generates link information from storage information of the photographed image data of the whiteboard 207 retrieved (having a similar mark) in step S309 and embeds the link information in the image data of the handout 208. At this time, image information of the mark originally written in the handout 208 is saved as invisible information in the file.

After converting the mark into the character string and performing embedding processing of the link information in step S310, then in step S311, the central processing unit 108 determines whether all of the marks recognized in step S307 have been processed. If the determination in step S311 is YES, then in step S312, the central processing unit 108 stores the image data of the handout 208 in which the link information is embedded in the storage destination specified in step S303, and then the processing ends. If the determination in step S311 is NO, the processing returns to step S309.

Figure 6A:
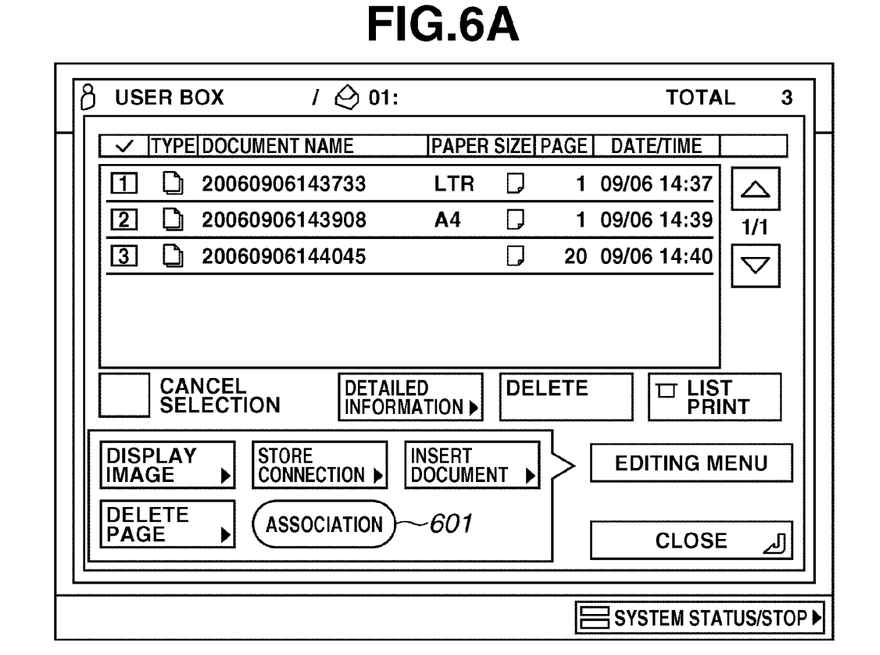
FIGS. 6A and 6B are views illustrating an example of an operation screen for executing association processing.
Figure 6B:
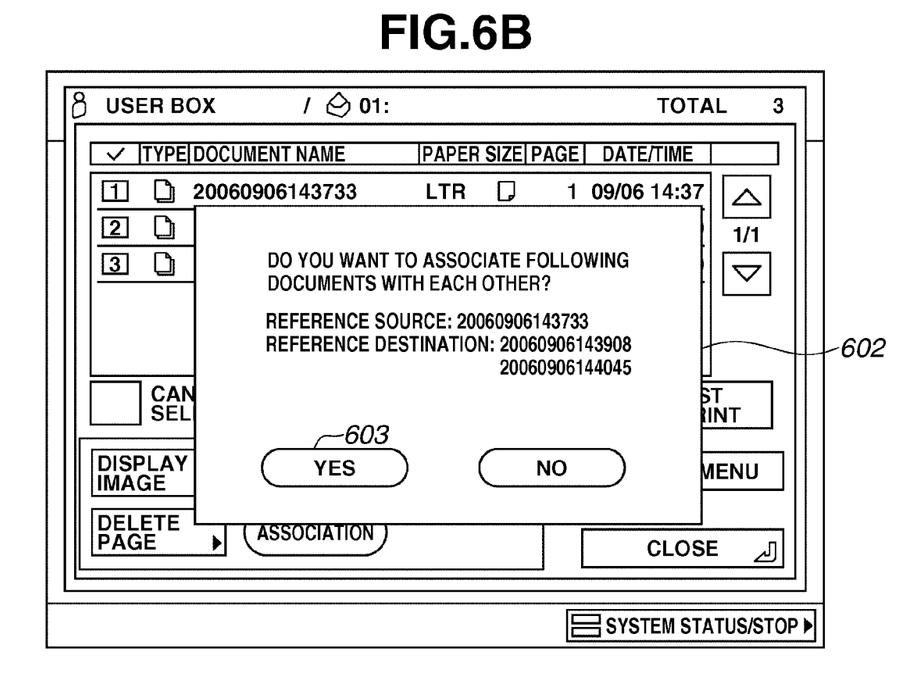

FIGS. 6A and 6B illustrate an example of an operation screen for executing the association processing according to the present embodiment. In step S305, when the user selects an image targeted as an association object on the operation screen illustrated in FIG. 6A and presses an "ASSOCIATION" button 601, a dialog 602 prompting the user to perform confirmation is displayed as illustrated in FIG. 6B. When the user presses a "YES" button 603 in the dialog 602, the association processing is executed.

Figure 7:
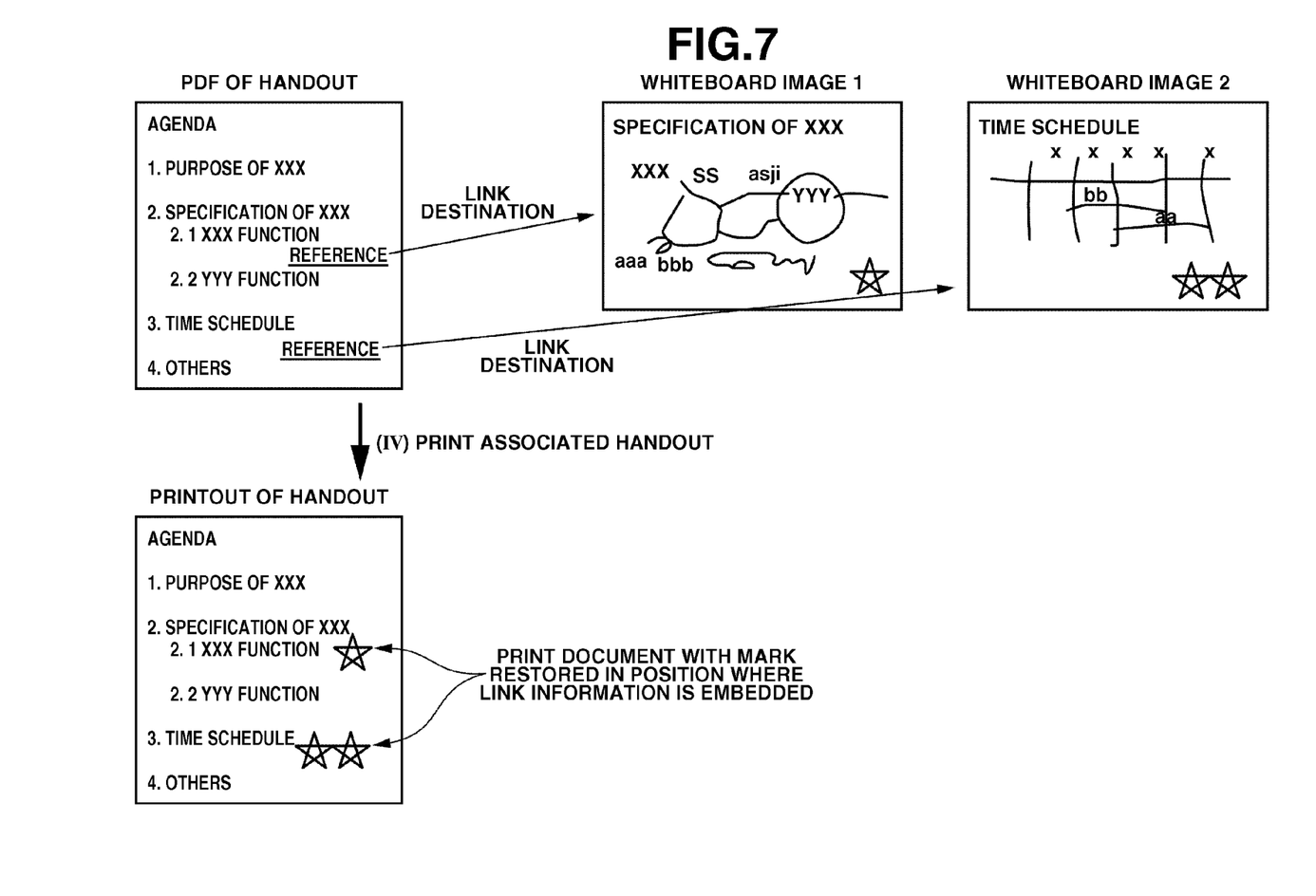
FIG. 7 is a view illustrating a result of printing processing of image data on which the association processing is performed according to the first exemplary embodiment of the present invention.

Next, processing for printing the associated image data is described below with reference to FIG. 7. FIG. 7 is a view for illustrating a result of printing processing of the image data on which the association processing is performed. As a result of the association processing, although the link information is embedded in the image data of the handout 208, in cases where the image data of the handout 208 is printed, the mark originally written is printed, not the character string.

Figure 4:
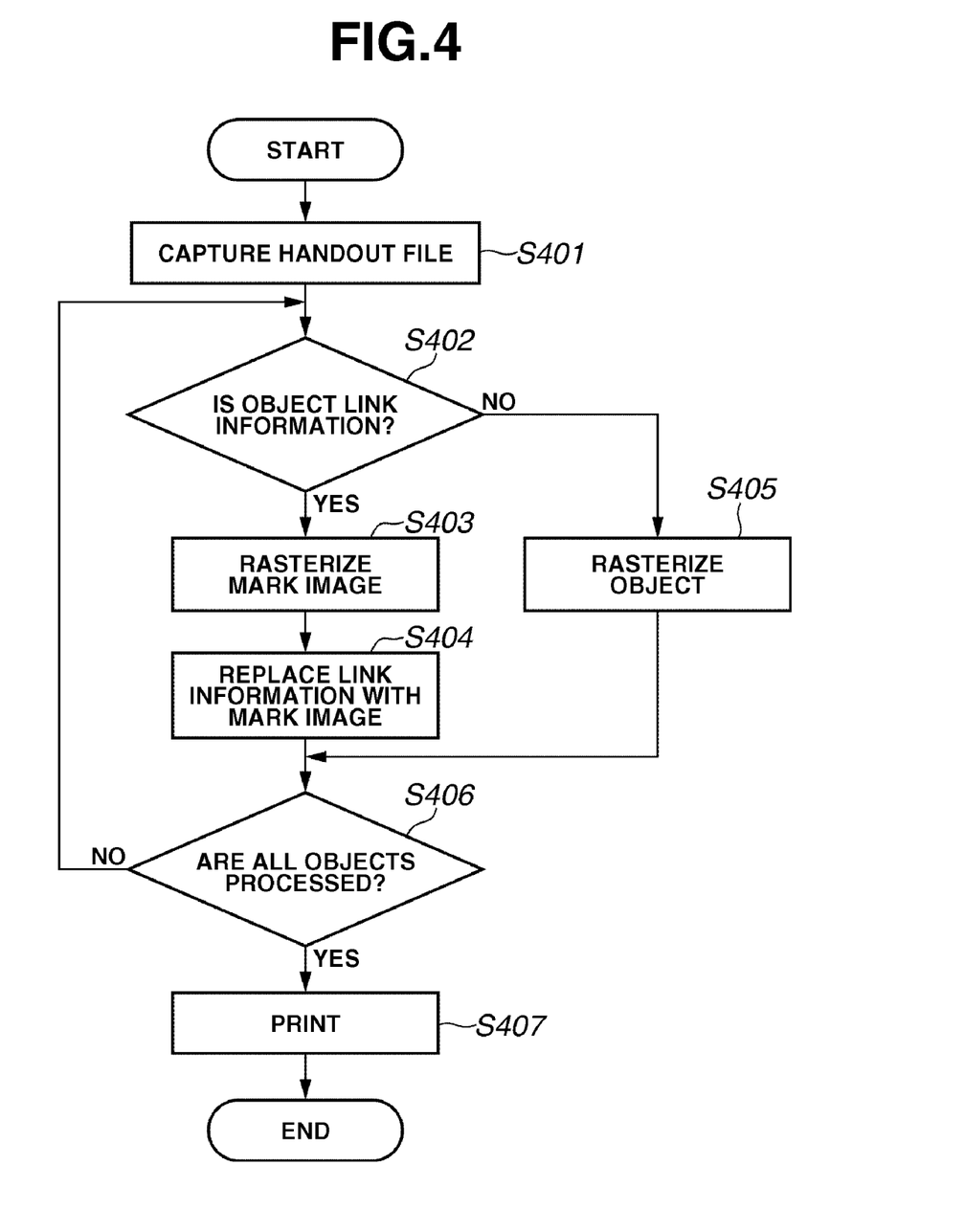
FIG. 4 is a flowchart illustrating a processing operation performed by the multifunction peripheral according to the first exemplary embodiment of the present invention.

The printing processing of image data of the handout 208 is described below with reference to FIG. 4. FIG. 4 is a flowchart illustrating a processing operation performed by the multifunction peripheral 201. In step S401, the central processing unit 108 captures the image data (handout file) of the handout 208 in which the link information is embedded into the storage device 109.

In step S402, the central processing unit 108 interprets a description of the handout file captured in step S401, selects an object included in the handout file, and determines whether the selected object is link information to the associated image data.

If the determination in step S402 is YES, then in step S403, the central processing unit 108 rasterizes image information of a mark included in an invisible region of the handout file captured in step S401. Then, in step S404, the central processing unit 108 replaces the character string indicating a link with the rasterized image information of the mark.

If the determination in step S402 is NO, then in step S405, the central processing unit 108 rasterizes the object.

In step S406, the central processing unit 108 determines whether all of the objects included in the handout file captured in step S401 have been processed. If the determination in step S406 is YES, then in step S407, the multifunction peripheral 201 prints an image rasterized by the image forming unit 101. Then, the processing ends. If the determination in step S406 is NO, the processing returns to step S402.

Second Exemplary Embodiment

According to a second exemplary embodiment of the present invention, not only reference information is embedded in image data of the handout 208, but also reference source information is embedded in photographed image data of the whiteboard 207 serving as a reference destination. Accordingly, user convenience can be improved.

Figure 9:
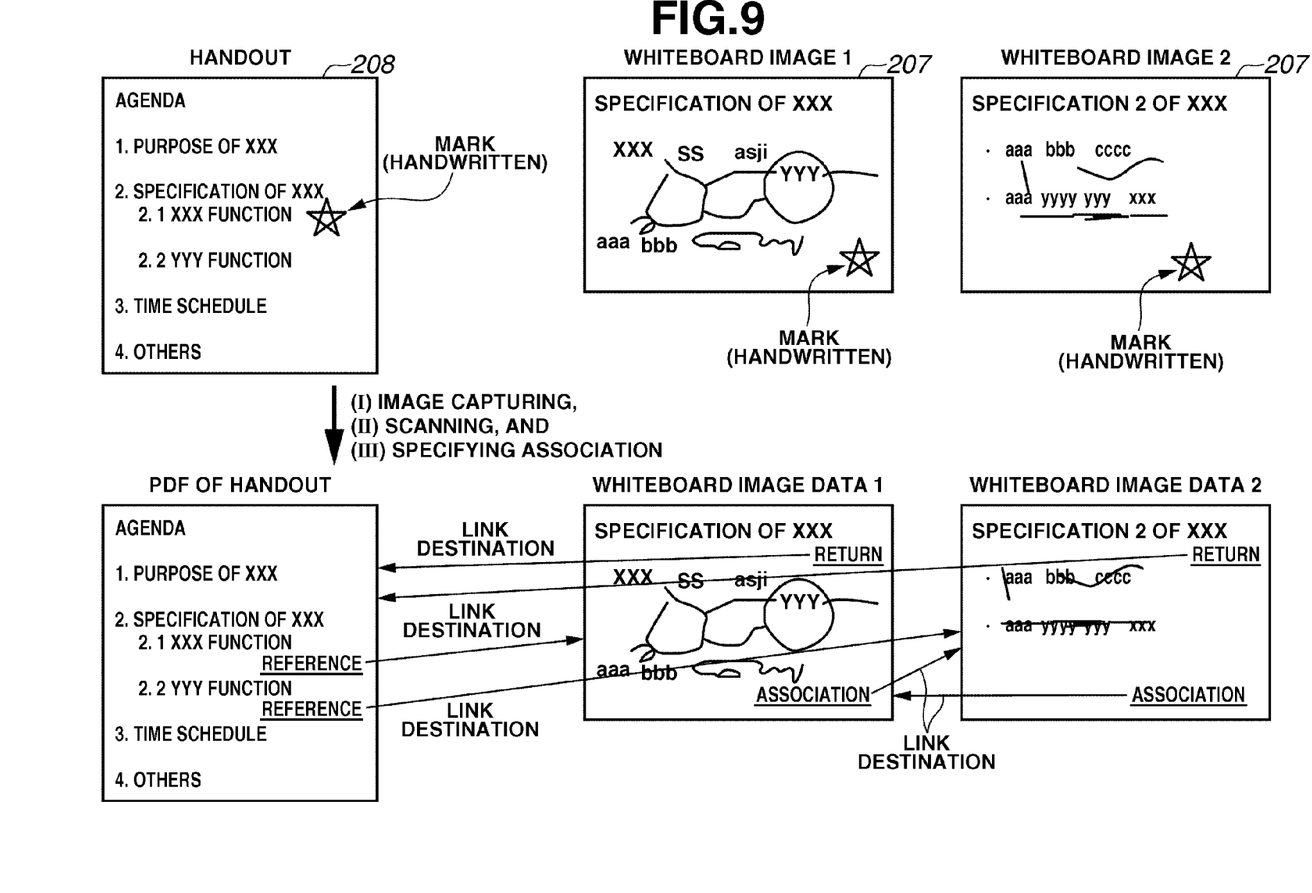
FIG. 9 is a view illustrating a relationship between a handout and a whiteboard and a result of association processing according to the second exemplary embodiment of the present invention.

Association processing of image data according to the second exemplary embodiment is described below with reference to FIG. 9. FIG. 9 is a view illustrating a relationship between the handout 208 and the whiteboard 207 and a result of the association processing. In the whiteboard 207, which is associated with the handout 208, a samemark similar to a specific mark (in the illustrated example, one star mark) written in the handout 208 is written by the user. In the example illustrated in FIG. 9, one star mark is written by the user to each of two images of the whiteboard 207.

Then, the user reads the handout 208 with the scanner 103 and photographs the whiteboard 207 with the digital camera 206. Then, the user causes the multifunction peripheral 201 to capture image data of the handout 208 and photographed image data of the whiteboard 207 and to perform association processing based on the mark. According to this processing, the mark written in the handout 208 is embedded as link information (reference destination information) to the photographed image data of the whiteboard 207, which is associated with the handout 208.

Further, link information (return destination information) to the image data of the handout 208, which is associated with the whiteboard 207, is embedded in the photographed image data of the whiteboard 207. Furthermore, mutual link information (association information) between two photographed image data sets is embedded in the photographed image data of the whiteboard 207.

Figure 8:
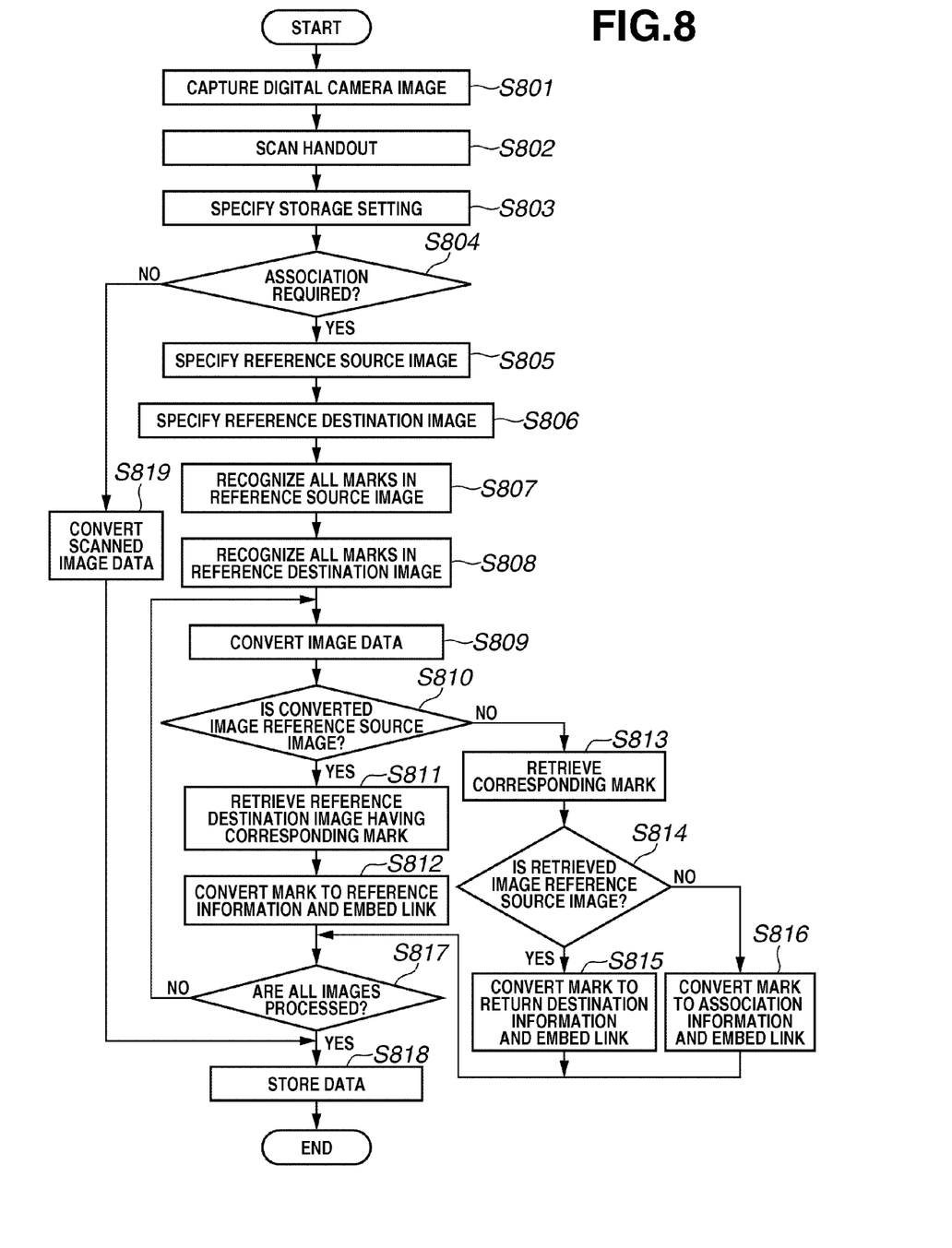
FIG. 8 is a flowchart illustrating a processing operation performed by a multifunction peripheral according to a second exemplary embodiment of the present invention.

The association processing of image data is described in detail below with reference to FIG. 8. FIG. 8 is a flowchart illustrating a processing operation performed by the multifunction peripheral 201. For example, the multifunction peripheral 201 performs association processing between image data acquired by reading, with the scanner unit 103, the paper document (handout) 208 distributed in the conference and image data acquired by photographing, with the digital camera 206, the whiteboard 207 used in the conference and stores the image data after the association processing. The multifunction peripheral 201 reads the handout 208 and photographs the whiteboard 207 after the user writes marks to respective associated portions on the handout 208 and the whiteboard 207.

In step S801, the user operates the operation unit 104 to instruct the multifunction peripheral 201 to capture image data. The multifunction peripheral 201 captures image data acquired by photographing, with the digital camera 206, the whiteboard 207 used in the conference into the storage device 109 via the input interface 106. The multifunction peripheral 201 can be physically directly connected to the digital camera 206 via a USB, or the multifunction peripheral 201 can be connected to the digital camera 206 by using radio technique or a device port.

In step S802, the user reads the handout 208 with the scanner unit 103 after performing appropriate reading setting via the operation unit 104. The multifunction peripheral 201 captures the scanned image data into the storage device 109. In reading the handout 208, the reading setting of a reading document size, a reading resolution, and a color mode can be performed.

In step S803, the user performs storage setting of a file format, a document name, and a storage destination for storing the captured image data. The selectable file format includes TIFF, JPEG, PDF, and HTML. In cases where PDF and HTML are specified as the file format, the user can specify the association processing. In addition, as a storage destination of image data, the user can specify the storage device 109 of the multifunction peripheral 201 or a directory of the file server 202 on the network.

In step S804, the central processing unit 108 determines whether the association processing is specified during the storage setting in step S803.

If the determination in step S804 is NO, then in step S819, the central processing unit 108 converts the image data of the handout 208 read in step S802 into the file format specified in step S803. Then, in step S818, the central processing unit 108 stores the converted image data in the specified storage destination, and then the processing ends.

If the determination in step S804 is YES, then in step S805, the user operates the operation unit 104 to specify an image serving as a reference source from among the photographed image of the whiteboard 207 captured in step S801 and the image of the handout 208 read in step S802. Similarly, in step S806, the user operates the operation unit 104 to specify an image serving as a reference destination from among the photographed image of the whiteboard 207 and the image of the handout 208.

In step S807, the central processing unit 108 recognizes all marks included in the reference source image data specified in step S805. Similarly, in step S808, the central processing unit 108 recognizes all marks included in the reference destination image data specified in step S806.

After performing recognition of marks included in a processing object image data in steps S807 and S808, then in step S809, the central processing unit 108 converts the processing object image data into the file format specified in step S803.

In step S810, the central processing unit 108 determines whether the image data subjected to the conversion processing in step S809 is the reference source image data specified in step S805.

If determination in step S810 is YES (if the processing object image data is the reference source image data), then in step S811, the central processing unit 108 retrieves reference destination image data having a mark similar to the mark recognized in step S807. In step S812, the central processing unit 108 converts the mark into the character string (in the illustrated example "REFERENCE") indicating that the link is established, in the reference source image data converted into the specified file format in step S809. Then, the central processing unit 108 generates link information from the storage information of the reference destination image data (having a similar mark) retrieved in step S811 and embeds the link information in the reference source image data.

In the present embodiment, an example of content data is image data. According to another exemplary embodiment, it is conceivable that an image can be called from HTML data to be displayed. Also, link information for referring to a reference destination can be defined with HTML data as a reference source while eliminating a mark in the image. An example of content data can be image data and HTML data. That is, there are prepared two image data sets. Each image data can be called from HTML data corresponding to that image to be displayed. For instance, if there is a mark in an image X, a link for defining the image X as a reference destination can be embedded in HTML data that corresponds to another image Y having a similar mark. HTML data can be called by establishing a link between HTML files corresponding to images having a similar mark. That is, the content data include HTML data for calling an image. Then, a link is embedded in the HTML data. The link is established between HTML data sets.

If the determination in step S810 is NO (if the processing object image data is the reference destination image), then in step S813, the central processing unit 108 retrieves reference source image data and reference destination image data having a mark similar to the mark recognized in step S808. In step S814, the central processing unit 108 determines whether the image data retrieved in step S813 is the reference source image data.

If the determination in step S814 is YES (being the reference source image data), then in step S815, the central processing unit 108 converts the mark into a character string (in the illustrated example, "RETURN") indicating that a link is established, in the reference source image data converted into the specified file format in step S809. Then, the central processing unit 108 generates link information from storage information of the reference source image data (having a similar mark) retrieved in step S813 and embeds the link information in the reference destination image data. At this time, image information of the mark written originally is saved as invisible information in the file.

On the other hand, if the determination in step S814 is NO (being the reference destination image data), then in step S816, the central processing unit 108 converts the mark into a character string (in the illustrated example, "ASSOCIATION") indicating that a link is established, in the reference destination image data converted into the specified file format in step S809. Then, the central processing unit 108 generates link information from storage information of the reference destination image data (having a similar mark) retrieved in step S813 and embeds the link information in the reference destination image data. At this time, image information of the mark written originally is saved as invisible information in the file.

After the processing in step S812, step S815, or step S816, then in step S817, the central processing unit 108 determines whether all of the processing object images specified in steps S805 and S806 have been processed. If the determination in step S817 is YES, then in step S818, the central processing unit 108 stores the image data in the storage destination specified in step S803, and then the processing ends. If the determination in step S817 is NO, the processing returns to step S809.

As described above, when the user writes a specific mark indicating association and instructs association processing, the mark can be automatically converted into link information and the link information can be automatically embedded. Therefore, it is not necessary for the user to make a determination on association based on the user's memory, to separately prepare a management table in which association is described, or to manually embed association information in a file. Accordingly, the association information can be assured and the user's trouble of having to perform association can be avoided.

In addition, when image data subjected to association processing is printed, a mark originally written, not a character string, is restored and printed. Therefore, association processing can be performed again using the printed image, so that a document cycle can be consolidated.

Furthermore, as a reference source and a reference destination can be specified, in cases where there are a plurality of marks indicating association, link information can be embedded as "reference", "return destination", and "association" according to the relationship of the reference source and the reference destination. Accordingly, image data can be stored while retaining more detailed association information.

Other Exemplary Embodiments

The present invention is also achieved in such a way that a storage medium storing program code of software for realizing the functions of the above-described exemplary embodiments is supplied to a system or an apparatus, and a computer (or CPU or micro processing unit (MPU)) of the system or the apparatus reads and executes the program code stored in the storage medium.

In this case, the program code itself read from the storage medium realizes the functions of the above-described exemplary embodiments.

The storage medium for supplying the program code includes, for example, a floppy disk, a hard disk, an optical disk, a magneto-optical disk, a compact disc-read-only memory (CD-ROM), a compact disc-recordable (CD-R), a magnetic tape, a non-volatile memory card, and a read-only memory (ROM).

In addition, an operating system (OS) operating on a computer can perform part or the whole of the actual processing based on an instruction of the program code and can realize the functions of the above-described exemplary embodiments.

Furthermore, program code read from a storage medium can be written in a memory provided on a function expansion board inserted into a computer or a function expansion unit connected to the computer. Then, a CPU provided on the function expansion board or the function expansion unit can perform part or the whole of the actual processing based on an instruction of the program code and can realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-165648 filed Jun. 22, 2007, which is hereby incorporated by reference herein in its entirety.

What is claimed is:

1. An image processing apparatus comprising:
at least one input device for inputting a plurality of pieces of content data which includes image data;
a recognition unit configured to recognize a mark included in the pieces of content data; and
an association processing unit configured to perform association processing by mutually establishing a link between at least two pieces of the content data based on the mark recognized by the recognition unit,
wherein the association processing unit converts the mark into a character string in the image data and embeds link information in the image data.

2. The image processing apparatus according to claim 1, wherein, when printing pieces of content data in which the link information is embedded, the image processing apparatus prints the mark.

3. The image processing apparatus according to claim 1, wherein the pieces of content data include image data read by an image reading unit configured to read an image of a document.

4. The image processing apparatus according to claim 1, wherein the pieces of content data include image data photographed by an image pickup apparatus.

5. The image processing apparatus according to claim 1, wherein the pieces of content data include HyperText Markup Language data for calling an image, a link is embedded in the HyperText Markup Language data, and the link is established between the HyperText Markup Language data.

6. A method comprising:
inputting a plurality of pieces of content data including image data;
recognizing a mark included in the pieces of content data;
performing association processing by mutually establishing a link between at least two pieces of content data based on the recognized mark;
converting the mark into a character string in the image data; and
embedding the link information in the image data.

7. The method according to claim 6, further comprising printing the mark when printing the pieces of content data in which the link information is embedded.

8. The method according to claim 6, wherein the pieces of content data include image data read by an image reading unit configured to read an image of a document.

9. The method according to claim 6, wherein the pieces of content data include image data photographed by an image pickup apparatus.

10. The method according to claim 6, wherein the pieces of content data include HyperText Markup Language data for calling an image, a link is embedded in the HyperText Markup Language data, and the link is established between the HyperText Markup Language data.

11. A non-transitory computer-readable storage medium storing instructions which, when executed by an apparatus, cause the apparatus to perform operations comprising:
inputting a plurality of pieces of content data including image data;
recognizing a mark included in the pieces of content data;
performing association processing by mutually establishing a link between at least two pieces of content data based on the recognized mark;
converting the mark into a character string in the image data; and
embedding the link information in the image data.

* * * * *